United States Patent [19]
Bottoms

[11] 3,789,292

[45] Jan. 29, 1974

[54] METHOD OF ACCURATELY MEASURING, DEPTHWISE, WELL CASING COLLARS FOR INTERPRETATIVE PURPOSES

[75] Inventor: Eugene R. Bottoms, Huntington Beach, Calif.

[73] Assignee: Chevron Research Company, San Francisco, Calif.

[22] Filed: Apr. 3, 1972

[21] Appl. No.: 240,408

Related U.S. Application Data

[63] Continuation of Ser. No. 863,064, Oct. 2, 1969, abandoned.

[52] U.S. Cl........... 324/34 R, 324/34 PS, 340/18 R
[51] Int. Cl. ...................... G01v 1/40, G01v 3/00
[58] Field of Search 166/66; 324/34 R, 34 PS, 34 D; 181/0.5 BH; 340/18 R

[56] References Cited
UNITED STATES PATENTS
3,434,046   3/1969   Wilson et al..................... 324/34 R FOREIGN PATENTS OR APPLICATIONS
685,151   12/1939   Germany.......................... 324/34 R Primary Examiner—Benjamin A. Borchelt
Assistant Examiner—H. A. Birmiel
Attorney, Agent, or Firm—A. L. Snow et al.

[57] ABSTRACT

Method and apparatus for accurately measuring differential distances along a cased well bore penetrating an earth formation by measuring, depthwise, the location of enlarged collars of the casings, using a sensor movably positioned within a mapping sonde traversing a well bore. The sensor is movably attached to the sonde through a transporting assembly; say, consisting of an endless belt driven between two sheaves, and controlled uphole by circuitry at the earth's surface, so as to indicate the location, depthwise, of at least two consecutively located collars of the casings, while the sonde is held stationary within the well bore. Through interpretation of the recorded results, differential movement of subterranean strata adjacent to the map casing can be inferred. Further, as unstable subterranean strata conditions are indicated, preventive measures, such as water flooding, can be undertaken prior to the occurrence of visual evidence, at the earth's surface, of the unstable conditions.

8 Claims, 3 Drawing Figures

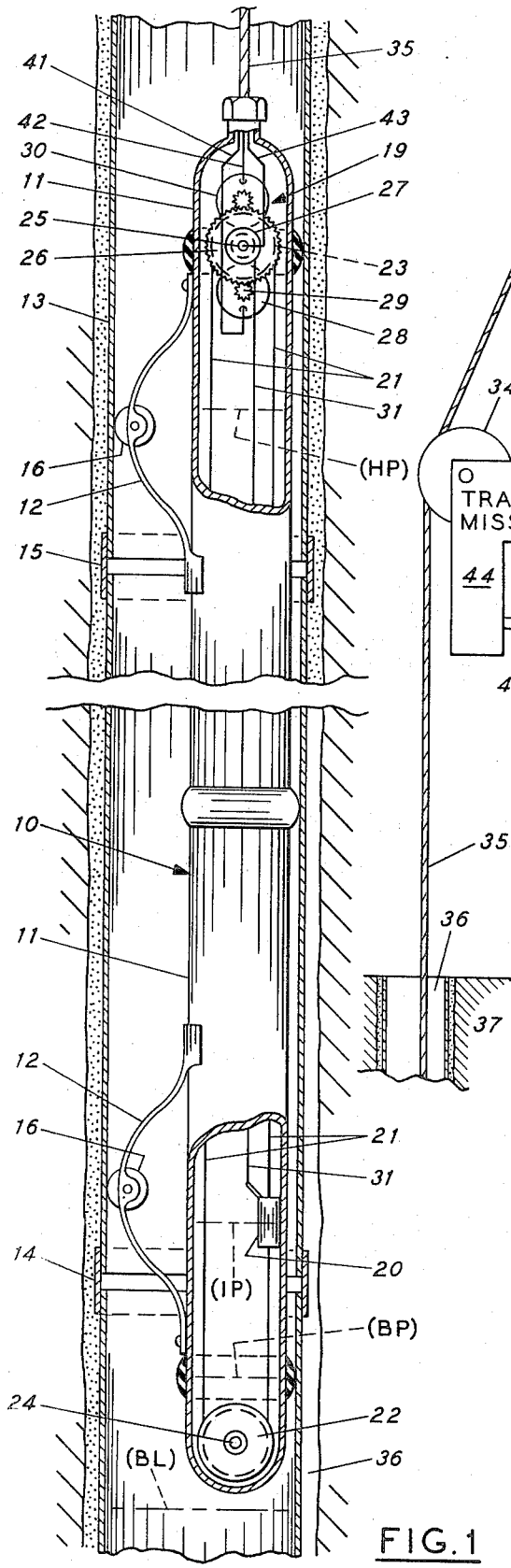

METHOD OF ACCURATELY MEASURING, DEPTHWISE, WELL CASING COLLARS FOR INTERPRETATIVE PURPOSES

This is a continuation of application Ser. No. 863,064, filed Oct. 2, 1969, now abandoned.

This invention relates to apparatus and method for accurately napping collared joints between adjacent sections of well casing and, more particularly, to a method of equating differential movement of adjoining sections of such casing to movement of the earth adjacent the well bore.

The present invention relates to a method of determining the differential movement of a well casing to indicate proportional movement of strata adjacent to the casing. In that way, after differential movement of the earth occurs, it can be detected and preventive measures undertaken to stabilize the affected earth formation. (An example: flooding the affected area with a stabilizing fluid such as water.)

As petroleum fluids are pumped from the earth, unstable earth conditions are not an uncommon occurrence. The incremental volume of the removed petroleum fluids can leave an unstable subterranean condition which can cause settling of the surrounding strata as, for example, has occurred in the Huntington Beach area of California.

In accordance with the present invention, collared joints between adjoining sections of casing are accurately mapped, using the variations in magnetic field introduced and detected by a magnetic field sensor undergoing movement relative to both sonde and well bore. In conventional collared joint locators, the effects of such joints on a magnetic field, introduced by means of a sensor fixedly mounted to the sonde, are used to locate the joints. As the sonde is drawn through the well bore, the collared joints can be mapped as a function of depth for the entire length of the casing. In the present invention, the mapping sonde is held stationary within the well bore during the mapping cycle: the magnetic field sensor, itself, traverses the distance within the sonde between at least two adjacent collared joints. Since, during movement of the magnetic field sensor, the sonde is stationary, the mapping results are exceedingly accurate, as usual mapping errors due to cable stretch, yo-yoing, etc., are minimized. Interpretation of the recorded results can be used to infer differential movement of subterranean strata adjacent the mapped casing. In that way, correct preventive measures can be undertaken prior to the occurrence of visual evidence at the earth's surface of the unstable stratal condition.

Further objects and features of the invention will be readily apparent to those skilled in the art from the specification and appended drawings illustrating a preferred embodiment wherein:

FIG. 1 is a side elevational view, partly cut away, of a mapping sonde positioned within a borehole, FIG. 2 is a detailed view of a downhole transporting assembly for the mapping sonde of FIG. 1, and FIG. 3 illustrates a control unit for operation of the mapping sonde of FIG. 1.

Reference is now made to the drawings and, in particular, to FIG. 1. As shown, mapping sonde 10 of the present invention includes an elongated housing 11 fitted with a pair of decentralizing support springs 12. During movement of the sonde along sections of well casing 13 (the sections being joined together at a series of enlarged joints, or collars, generally indicated at 14 and 15), the decentralizing support springs 12 contact the well casing 13 through rollers 16. Within the sonde, a collar sensor 20 is fixedly attached to a depthwise transporting assembly 19, including an endless belt 21 wound about and supported by sheaves 22 and 23. Sheave 22—the idler sheave—is mounted to housing 11 by shaft 24 at the tail of the sonde. In the head of the sonde, sheave 23—called the drive sheave—is mounted to the housing 11 by shaft 25. Sensor 20 is attached to belt 21.

FIG. 2 illustrates the downhole transporting assembly 19 in more detail.

As indicated, the driving sheave 23 includes opposing flats in surface contact with a spur gear 26 and stowage pulley 27, respectively. In order to provide unit rotation of spur gear 26, driving sheave 23 and stowage pulley 27 about shaft 25, these members are keyed together (by means of fastening means not shown) at their mating surfaces. To drive spur gear 26, in rotation, a drive motor 28 is coupled at the periphery of spur gear 26 through a pinion gear 29. To provide feedback timing logic back to the earth's surface, a position translator 30 is coupled at the periphery of spur gear 26 at a radial position diametrically opposed to drive motor 28. As motor 28 is actuated by uphole control circuitry, as explained in more detail below, sheave 23 is driven in rotation through gears 26, 29 to provide rectilinear movement of the sensor 20 (FIG. 1). As the sensor undergoes movement relative to the sonde, conductor 31 (attached at its remote end to a pickup coil within the sensor 20, not shown) undergoes rotational movement about stowage pulley 27.

Magnetic field sensor 20 is conventional in the art for indicating location, depthwise, of casing collars 14 and 15 of well casing 13 of FIG. 1, using variations in a magnetic field from a set point level to generate signals as a collar is located. Magnetic field sensor 20 includes permanent magnets capable of generating a magnetic field within the well casing 13, as well as a pickup coil, or coils, sensitive to variations in magnetic fields produced at differing regions along the permanent magnets. As an example of such a magnetic field sensor utilizing variations in magnetic fields to indicate, depthwise, casing collars, reference is made to U.S. Pat. No. 2,558,427, H. C. Fagan, "Casing Collar Locator," and U.S. Pat. No. 2,967,774, G. Peterson, "Casing Joint Locator."

FIG. 3 illustrates the operation of the present invention in more detail.

As shown in FIG. 3, a suspension pulley 34 is used to control movement of sonde cable 35 attached to the mapping sonde along cased well bore 36 penetrating earth formation 37. Pulley 34 is driven through a transmission/brake 44 directly journaled to motor 45. Also connected to motor 45 through clutch 46 is chart drive shaft 47 for driving recording medium 48 past a series of styli 49. After cable 35 has passed over pulley 34, the cable can be stored on stowage drum 39. Within the cable 35 there are included three electrical conductors (conductors 41, 42 and 43 of FIG. 1) connected to commutator rings 40 schematically illustrated at drum 39.

Depth marks are printed along the left-hand edge of the record 48 through a printer 50 connected to the shaft of motor 45 through depth generator 51. Chart drive shaft 47 is also seen to be journaled at an opposite end through clutch 52 to motor 53. To carry out the method of the present invention, programmer 55 is connected to the sonde, downhole, through controller 56. Controller 56 is also connected to motor 53 so as to intermediately drive the chart motor on command from the programmer 55 independent of motor 45.

Timing logic for automatically controlling the method of the present invention is provided by correctly programmed circuit elements within programmer 55.

In order to establish a rough index of the location of casing collars of the casing 13, the mapping sonde 10 (FIG. 1) is first lowered to a mapping base line (BL), say at the bottom of the well bore 36. The sensor 20 is set at an intermediate position (IP), a predetermined distance above the trailing end of the tail of the sonde. The programmer 55 of FIG. 3 then: disengages clutch 52 (if engaged); actuates switch 58 so as to connect the sensor within the sonde to one of the styli 49, say stylus 49a; and engages clutch 46 so that motor 45 is engaged with both chart drive shaft 47 and pulley 34. The sonde then is traversed upward through the borehole. As collar joints are passed, a series of pulse peaks 59a, 59b, etc., are generated along line 59 of record 48. Remaining styli 49 are disengaged from contact with the record 48. Depth marks are indicated along the left-hand side of the record 48.

After stylus 49a has been disengaged, the mapping sonde is then returned to the mapping base line (BL) within the bore-hole. It should be noted that during the lowering of the mapping sonde, the chart shaft 47 is in operative engagement with pulley 34 so as to cause the recording medium to rotate in reverse fashion and return the head section of the record to its original position adjacent to the styli 49. Stylus 49a is translated—columnwise—to the right as viewed in FIG. 3 and caused to engage in marking position with record 48 in the position shown in FIG. 3. Styli 49b and 49c are also placed in marking contact with record 48, as shown. The programmer 55 actuates motor 45 raising the sonde until the sensor 20 of FIG. 1 is located adjacent to casing collar 14. Although all styli 49 are in marking contact with the record 48, only stylus 49a is electrically connected—via switch 58—to downhole sensor 20. As the casing collar 14 is passed, a first peak 60a along line 60 is generated onto record 48. As peak 60a is generated, the sonde is stopped.

After clutch 46 is disengaged and clutch 52 engaged, controller 56 is then energised to pass control signals downhole to drive motor 28 of the downhole transporting system 19 (FIG. 1) to relocate the sensor 20 to base position (BP) adjacent to idler sheave 22. Simultaneously, motor 53 is activated by controller 56 to drive chart shaft 47 proportional to the relocation movement of the sensor 20. Controller 56 then activates switch 58 so that stylus 49b is placed in electrical control with the sensor 20. Styli 49a and 49c are not connected to the sensor. Controller 56 then provides control signals downhole to cause upwards linear movement of the sensor 20. Simultaneously with upward movement of the sensor, motor 53 is driven by the controller so as to drive record 48 past energized stylus 49b. As consecutive collar locations 14 and 15 are passed by the moving sensor 20, signal peaks 61a, 61b are generated and recorded along line 61 on record 48 by the stylus 49b.

In controlling the movement of sensor 20, the controller 56 energizes drive motor 28 downhole in the sonde. In order to provide feedback control signals, translator 30 provides monitoring signals back to the controller 56. When the sensor reaches the end of travel, position (HP), sensor movement is terminated. Since the distance of travel of the sensor locates at least two casing collars, the distance of travel must be greater than each section of casing. All styli 49 are then disengaged from electrical contact with sensor 20 by operation of switch 58.

The sensor 20 then is relocated from its position (HP) to its intermediate position (IP) above collar 14 but below the second collar 15. Switch 58 is then actuated so as to cause engagement of the stylus 49a with the downhole sensor.

Clutch 52 is then disengaged and clutch 46 engaged. Motor 45 is then actuated so as to cause the sonde to raise along the borehole until a second peak 60b is generated along line 60 of record 48. The sonde is stopped; clutch 46 is then disengaged and clutch 52 then engaged. Stylus 49a is then disengaged from electrical contact with sensor 20, and stylus 49c is then connected thereto through switch 58. Programmer 55 then actuates controller 56 so as to cause linear movement of the sensor to thereby map two more collar locations which are indicated at peaks 62a and 62b along line 62 on record 48.

By alternating sensor response between styli 49b and 49c, the process can be repeated so as to accurately indicate the location of casing collars along the well bore.

Table I summarizes the operation of the method of the present invention during mapping of a cased well bore.

It should be evident that during movement of the sensor 20, as well as the sonde 10 of FIG. 1, the chart drive shaft 47 of FIG. 3 is engaged to record the extent of such movement. Thus the peaks recorded along the record 48 by styli 49b and 49c are directly indicative of the length of sections between collar joints. Accuracy: Aside from the limitation of usual mapping problems such as yo-yoing and other adverse effects due to the sonde weight, the record 48 includes two separate response lines, e.g., lines 61 and 62, which contain peak-to-peak segments related to the same casing sections. By cross-checking the incremental distance between such common segments of the record, extremely accurate interpretations as to the variations in section length of the mapped casing can be obtained.

TABLE I

|  | Styli | | | Drive motor | | Clutches | | Downhole drive motor, 28 |
|---|---|---|---|---|---|---|---|---|
|  | 49a | 49b | 49c | 45 | 53 | 46 | 52 |  |
| 1. After sonde is lowered to base line (BL) with sensor set at (IP), map collars along entire length of cased well bore. | Active | Inactive | Inactive | Active | Inactive | Active | Inactive | Inactive |
| 2. After sonde has been dropped back to (BL), map upwards again until a first collar is located, and the sonde is stopped. | do | do | do | do | do | do | do | Do. |
| 3. Lower sensor to lowest mapping position (BP) below last indicated collar. | Inactive | Active | do | Inactive | Active | Inactive | Active | Active. |
| 4. Energize sensor to cause upwards movement to map at lease two consecutively located collars. | do | do | do | do | do | do | do | Do. |
| 5. After stopping sensor, drop sensor to (IP) position above next-to-last mapped collar but below last mapped collar. | do | Inactive | do | do | do | do | do | Do. |
| 6. Raise sonde until next collar mapped. | Active | do | do | Active | Inactive | Active | Inactive | Inactive. |
| 7. Repeat, in sequence, steps 3-6. | | | | | | | | |

Further interpretation of the recorded results can be used to infer (from the aforementioned incremental distance variations of the casing sections) the extent of differential movement of the subterranean strata adjacent to the mapped casing; that is, from the variations in incremental section length, the section stress conditions (compressive or tensile) can be determined, indicating the conditions of the adjacent strata. In that way, correct preventive measures, such as water flooding, can be undertaken to stabilize subterranean zones of strata prior to the occurrence of visual evidence of that instability of the earth's surface.

While certain preferred embodiments of the invention have been specifically disclosed, it should be understood that the invention is not limited thereto as many variations will be readily apparent to those skilled in the art, and the invention is to be given its broadest possible interpretation within the terms of the following claims. For example, it is sometimes desirable to mount other geologic or borehole sensing devices within the sonde described above. This is especially true where the device requires additional stabilization prior to operation, as for example in borehole camera devices.

I claim:

1. The method of accurately measuring incremental distances along a well casing of a borehole penetrating an earth formation comprising:
   a. positioning within said well casing at a series of logging positions, a mapping sonde having a casing-joint sensor movably attached thereto,
   b. while the mapping sonde is stationary at each of said selected logging positions, traversing a casing-joint sensor relative to both the sonde and the well casing along a logging path having segments in close proximity to two adjacent consecutively positioned joints of said well casing, said two adjacent casing joints defining an incremental section of said well casing, and
   c. generating electrical characteristics indicative of the separate depth locations of said two adjacent positioned casing joints so as to indicate, accurately, the true length of said incremental section of well casing.

2. The method in accordance with claim 1 with the additional step of:
   d. determining incremental distance variation, if any, between (i) the true length of the incremental section of well casing as determined by step (c), above and (ii) a standard unstressed length for the same section, said variation indicating a zone of unstable subterranean stratum adjacent to the well casing.

3. The method in accordance with claim 2 with the additional step of:
   e. stabilizing said indicated zones of unstable strata by passing fluid through said well bore into said indicated zones, at depth, in sufficient quantity so as to minimize incremental movement of said strata relative to the earth's surface.

4. The method in accordance with claim 3 in which said stabilizing fluid is water.

5. In a well casing logging system including a mapping sonde, a cable attached to said sonde, and drive means attached uphole to said cable for positioning said sonde series of mapping stations along a well casing of a borehole penetrating an earth formation in which said sonde utilizes a casing-joint sensor for detecting the location of casing joints of said well casing by means of magnetic field variations which are used to generate recordable signals, the improvement comprising:
   a. means for traversing said casing-joint sensor relative to both said mapping sonde and said well casing along a mapping path having segments in close proximity to two consecutively located casing joints of said well casing while said mapping sonde and said cable attached thereto are stationary within said well casing, and
   b. control logic means operatively attached to said sensor moving means and said drive means for said mapping sonde for controlling, independently, movement of said sensor and said mapping sonde relative to said well casing.

6. The improvement of claim 5 in which (a) includes:
   i. sheave means rotatably attached to said mapping sonde and including endless belt means rotatably attached to said sheave means, and said endless belt means also being fixedly attached at a segment thereof to said casing-joint sensor,
   ii. means for driving said sheave means in rotation so as to cause rectilinear movement of said casing-joint sensor along said mapping path in close proximity to said two consecutively located casing joints, and
   iii. downhole position translating means operatively attached to said sheave means for determining the extent of travel of said sensor and said endless belt means, said drive means and downhole position translating means being operatively connected uphole to said control logic means.

7. The method of accurately measuring incremental distances along a well casing of a borehole penetrating an earth formation, comprising:
   a. positioning at a series of logging stations within said borehole, a mapping sonde by means of selective movement of a cable attached at one end to the sonde and extending along said borehole to an uphole terminous position adjacent the earth's surface.
   b. while the cable and mapping sonde remain stationary at each of said series of logging stations, traversing a casing-joint sensor movably attached relative to said mapping sonde and said well casing along a mapping path having segments in close proximity of at least two consecutively located casing joints of said well casing, said two consecutively located casing joints defining an incremental section of said well casing, and
   c. when said casing-joint sensor is located in close proximity of each of said two casing joints, generating an electrical characteristic indicative of the depth location thereof so as to indicate, accurately, the true length of said incremental section of said well casing.

8. The method of claim 7 further characterized by determining the next adjacent logging station by:
   d. while said sonde and cable remain stationary, traversing in a reverse direction said casing-joint sensor along said mapping path to an intermediate depth position between said two previously located casing joints,
   e. then causing the mapping sonde and cable to be drawn through the borehole in a forward direction, f. when said sensor is in close proximity to last mapped casing joint, terminating said forward movement of said mapping sonde and cable whereby the logging sonde is positioned at the next adjacent logging station.

* * * * *